United States Patent [19]

McCombs

[11] Patent Number: 5,778,194
[45] Date of Patent: Jul. 7, 1998

[54] METHOD AND APPARATUS FOR MEASURING PERFORMANCE OF A COMPUTER BUS

[75] Inventor: Craig C. McCombs, Wichita, Kans.

[73] Assignee: Symbios, Inc., Fort Collins, Colo.

[21] Appl. No.: 629,154

[22] Filed: Apr. 8, 1996

[51] Int. Cl.[6] ........................................ G06F 13/00
[52] U.S. Cl. ................ 395/280; 395/878; 395/550; 395/293; 395/775; 370/85
[58] Field of Search ............................ 395/280, 325, 395/293, 306, 287, 299, 775, 551, 308, 878; 370/85

[56] References Cited

U.S. PATENT DOCUMENTS

| | | | |
|---|---|---|---|
| 4,367,525 | 1/1983 | Brown et al. | 364/200 |
| 4,821,178 | 4/1989 | Levin et al. | 364/200 |
| 5,293,384 | 3/1994 | Keeley et al. | 371/16.3 |
| 5,347,647 | 9/1994 | Allt et al. | 395/575 |
| 5,379,384 | 1/1995 | Solomon | 395/325 |
| 5,388,237 | 2/1995 | Sodos | 395/425 |
| 5,426,741 | 6/1995 | Butts, Jr. et al. | 395/325 |
| 5,434,872 | 7/1995 | Petersen et al. | 371/57.1 |
| 5,440,722 | 8/1995 | VanderSpek et al. | 395/183.19 |
| 5,440,751 | 8/1995 | Santeler et al. | 395/800 |
| 5,446,869 | 8/1995 | Padgett et al. | 395/500 |
| 5,450,551 | 9/1995 | Amini et al. | 395/299 |
| 5,519,872 | 5/1996 | Khandekar et al. | 395/775 |
| 5,522,050 | 5/1996 | Amini et al. | 395/306 |
| 5,537,664 | 7/1996 | Rowland et al. | 395/879 |
| 5,557,755 | 9/1996 | Krein et al. | 395/293 |
| 5,557,757 | 9/1996 | Gephardt et al. | 395/306 |
| 5,568,621 | 10/1996 | Wooten | 395/292 |
| 5,613,075 | 3/1997 | Wade et al. | 395/287 |
| 5,623,645 | 4/1997 | Yip et al. | 395/551 |

FOREIGN PATENT DOCUMENTS

| | | | |
|---|---|---|---|
| 0076921 | 4/1983 | European Pat. Off. | G06F 13/12 |
| 0671691 | 9/1995 | European Pat. Off. | G06F 13/12 |

OTHER PUBLICATIONS

VLSI and Computer Peripherals; VLSI Based Tools for Monitoring Bus Communication Channels; May 8–12, 1989; No. 1989, May 8, 1989; F. Gregoretti et al.; pp. 4–81–4–84.

Primary Examiner—Ayaz R. Sheikh
Assistant Examiner—Eric Thlang
Attorney, Agent, or Firm—Paul J. Maginot; Wayne P. Bailey

[57] ABSTRACT

A method and apparatus for a method for measuring performance of an I/O bus. The method includes the steps of (a) determining a number of I/O bus clock cycles that occur during I/O bus transactions involving a peripheral device during a time period, and (b) determining a bus performance value for the I/O bus based on the number of I/O bus clock cycles determined in step (a). One embodiment of the apparatus includes a mechanism for determining a bus utilization value for the I/O bus based on the number of I/O bus clock cycles counted by the counter. Another embodiment of the apparatus includes a mechanism for determining a bus efficiency value for the I/O bus based on the number of I/O bus clock cycles counted by the counter.

17 Claims, 7 Drawing Sheets

METHOD AND APPARATUS FOR MEASURING PERFORMANCE OF A COMPUTER BUS

BACKGROUND OF THE INVENTION

The present invention relates generally to a bus monitoring device, and more particularly to a monitoring device which facilitates determining I/O (Input/Output) bus performance characteristics such as the utilization or efficiency of an I/O bus relative to a peripheral device.

A PCI (Peripheral Component Interconnect) Local Bus is a known high performance, 32-bit or 64-bit I/O bus with multiplexed address and data lines. It is intended for use as an interconnect mechanism between highly integrated peripheral controller components, peripheral add-in boards, and processor/memory systems. A PCI Local Bus standard is defined in the document entitled *PCI Local Bus Specification, Revision* 2.1 which is available from the PCI Special Interest Group, P.O. Box 14070, Portland, Oreg. 97214, and which is incorporated herein by reference.

A SCSI (Small Computer System Interface) bus is a known I/O bus which is used for connecting computers to peripheral devices, such as hard disks and printers. That is, a SCSI bus is typically an external and lower speed I/O bus which is primarily used for connecting peripheral devices to a higher speed system I/O bus such as a PCI Local Bus. A SCSI standard is defined by the X3T9.2 committee of the American National Standards Institute (ANSI). The first version of the standard, SCSI-1, is described in ANSI Document No. X3.131-1986 which is incorporated herein by reference. The SCSI-1 specification has been upgraded with an expanded interface referred to as SCSI-2. The SCSI-2 specification is described in ANSI Document No. X3.131-1994 which is also incorporated herein by reference. The ANSI committee is presently working on a SCSI-3 specification.

One problem with incorporating an I/O bus such as a PCI Local Bus or a SCSI bus into a given computer system architecture, is that there are not many diagnostic tools available for a design engineer or an end user to gain insight into how well the I/O bus is being utilized by a peripheral device such as a peripheral controller component or a peripheral add-in board that is connected to the I/O bus. That is, there appears to be no simple and cost effective tool for measuring or otherwise determining the utilization or efficiency of an I/O bus during I/O bus transactions involving a particular peripheral device, either during a product development phase, or in an end-user environment.

What is needed therefore is a simple and cost effective bus monitoring device which facilitates measuring or otherwise determining the utilization or efficiency of an I/O bus during bus transactions involving a particular peripheral device, and which may be incorporated into another integrated circuit that interfaces with the I/O bus.

SUMMARY OF THE INVENTION

In accordance with one embodiment of the present invention, there is provided a method for measuring performance of an I/O bus. The method includes the steps of (a) determining a number of I/O bus clock cycles that occur during I/O bus transactions involving a peripheral device during a time period, and (b) determining a bus performance value for the I/O bus based on the number of I/O bus clock cycles determined in step (a).

Pursuant to another embodiment of the present invention, there is provided an apparatus for measuring performance of an I/O bus. The apparatus includes a counter connected to the I/O bus for counting a number of I/O bus clock cycles that occur during I/O bus transactions involving a peripheral device during a time period, and a mechanism for determining a bus utilization value for the I/O bus based on the number of I/O bus clock cycles counted by the counter.

Pursuant to yet another embodiment of the present invention, there is provided an apparatus for measuring performance of an I/O bus. The apparatus includes a counter connected to the I/O bus for counting a number of I/O bus clock cycles that occur during data transfers involving the peripheral device during the time period, and a mechanism for determining a bus efficiency value for the I/O bus based on the number of I/O bus clock cycles counted by the counter.

It is therefore an object of the present invention to provide a new and useful method for measuring the performance of an I/O bus.

It is an object of the present invention to provide an improved method for measuring the performance of an I/O bus.

It is an object of the present invention to provide a new and useful apparatus for measuring the performance of an I/O bus.

It is an object of the present invention to provide an improved apparatus for measuring the performance of an I/O bus.

It is an object of the present invention to provide a new and useful method for measuring the efficiency and/or utilization of a PCI Local Bus relative to a PCI compliant peripheral device.

It is an object of the present invention to provide an improved apparatus for measuring the efficiency and/or utilization of a PCI Local Bus relative to a PCI compliant peripheral device.

It is yet another object of the present invention to provide a I/O bus monitoring device which is incorporated into an integrated circuit of a PCI compliant device.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
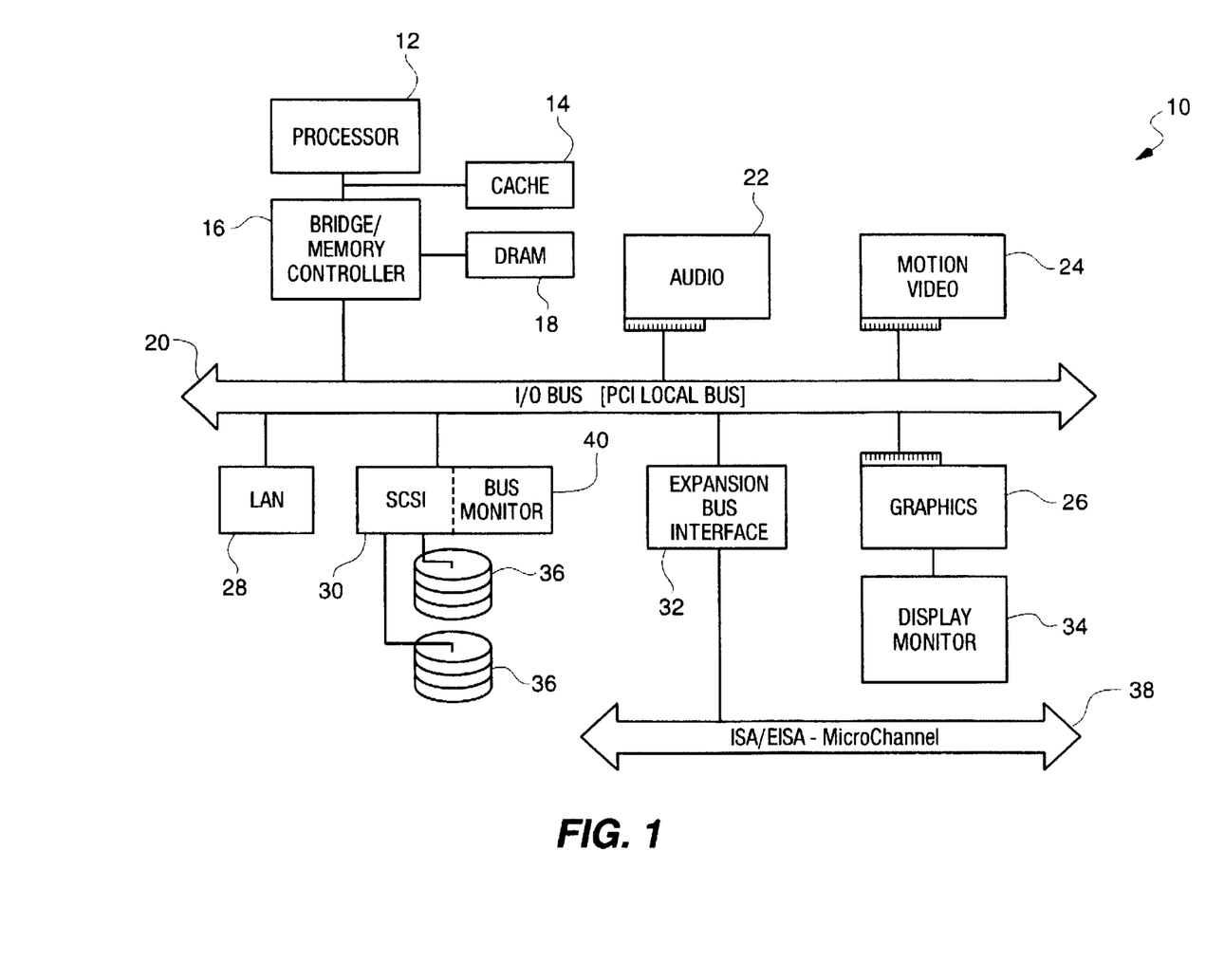
FIG. 1 is a block diagram of a first embodiment of a computer system architecture which incorporates the features of the present invention therein.

Referring now to FIG. 1, there is shown a block diagram of a computer system architecture 10 which incorporates the features of the present invention therein. The computer system architecture 10 may include a processor 12, cache 14, bridge/memory controller 16, DRAM (Dynamic Random Access Memory) 18, I/O (Input/Output) bus 20 such as a PCI Local Bus, a Micro-Channel bus or any high speed I/O system bus, and a number of peripheral devices. In particular, the computer system architecture 10 may include a number of peripheral add-in boards or cards such as audio card 22, motion video card 24 and graphics card 26, a number of controllers such as LAN host adapter 28 and SCSI host adapter 30, and an expansion bus interface 32.

A display monitor 34 may be operatively connected to the graphics card 26. One or more known disk drives 36 may be connected to the SCSI host adapter 30. It should be appreciated that the host adapter 30 may conform with data transfer protocols other than SCSI, for instance IDE (Integrated Device Electronics), FDDI (Fiber Distributed Data Interface), SSA (Serial Storage Architecture), or Fibre Channel. The expansion bus interface 32 may interface an expansion bus 38 such as an ISA (Industry Standard Architecture), or EISA (Extended Industry Standard Architecture) bus to the I/O bus 20.

The processor 12, cache 14 and DRAM 18 are connected to the I/O bus 20 through the bridge/memory controller 16 which provides a low latency path through which the processor 12 may directly access the peripheral devices that are mapped in memory or I/O address spaces. The bridge/memory controller 16 also provides a path which permits the peripheral devices to directly access the DRAM 18.

The computer system architecture 10 also includes a bus monitoring apparatus 40. As described in detail below, the bus monitor 40 monitors a particular peripheral device for a predetermined amount of time to determine the effectiveness of bus transactions across the I/O bus 20 relative to the particular peripheral device. The effectiveness of I/O bus transactions may be measured in performance terms such as bus utilization, or bus efficiency. In particular, the bus monitor 40 facilitates quantifying the utilization or efficiency of the I/O bus 20 with regard to a particular peripheral device. As described hereinafter, bus utilization is defined as a ratio of the total number of clock cycles used for bus transactions across the I/O bus during a predetermined time period or interval, to the total number of clock cycles available for bus transactions across the I/O bus during the predetermined time interval.

Likewise, bus efficiency is defined as a ratio of the total number of clock cycles used for transferring data across the I/O bus 20 during a predetermined time period or interval, to the total number of clock cycles used for bus transactions across the I/O bus during the predetermined time interval. However, it should be appreciated that bus utilization and bus efficiency may be defined differently depending upon the particular specifications of the I/O bus being monitored. In addition, by changing the state machine(s), other I/O bus performance characteristics may be monitored.

As shown in FIG. 1, the bus monitor 40 is associated with the SCSI host adapter 30. However, it should be appreciated that the bus monitor 40 may be associated with other types of peripheral devices, such as audio card 22, motion video card 24 or graphics card 26, or associated with any other type of controller such as LAN host adapter 28. The bus monitor 40 may stand alone as a separate integrated circuit mounted on a circuit board of the particular peripheral or controller with which it is associated. Preferably, the bus monitor 40 may be integrated with other circuitry into an integrated circuit forming at least a portion of the particular peripheral or controller with which it is associated.

The bus monitor 40 of the present invention will hereafter be discussed relative to a particular I/O bus implementation such as a PCI Local Bus 20, and a particular peripheral device such as the SCSI host adapter 30. However, it should be appreciated that the bus monitor 40 may operate with different types of I/O buses such as a SCSI bus, and the bus monitor 40 may be associated with different types of peripheral devices as enumerated above.

Figure 2:
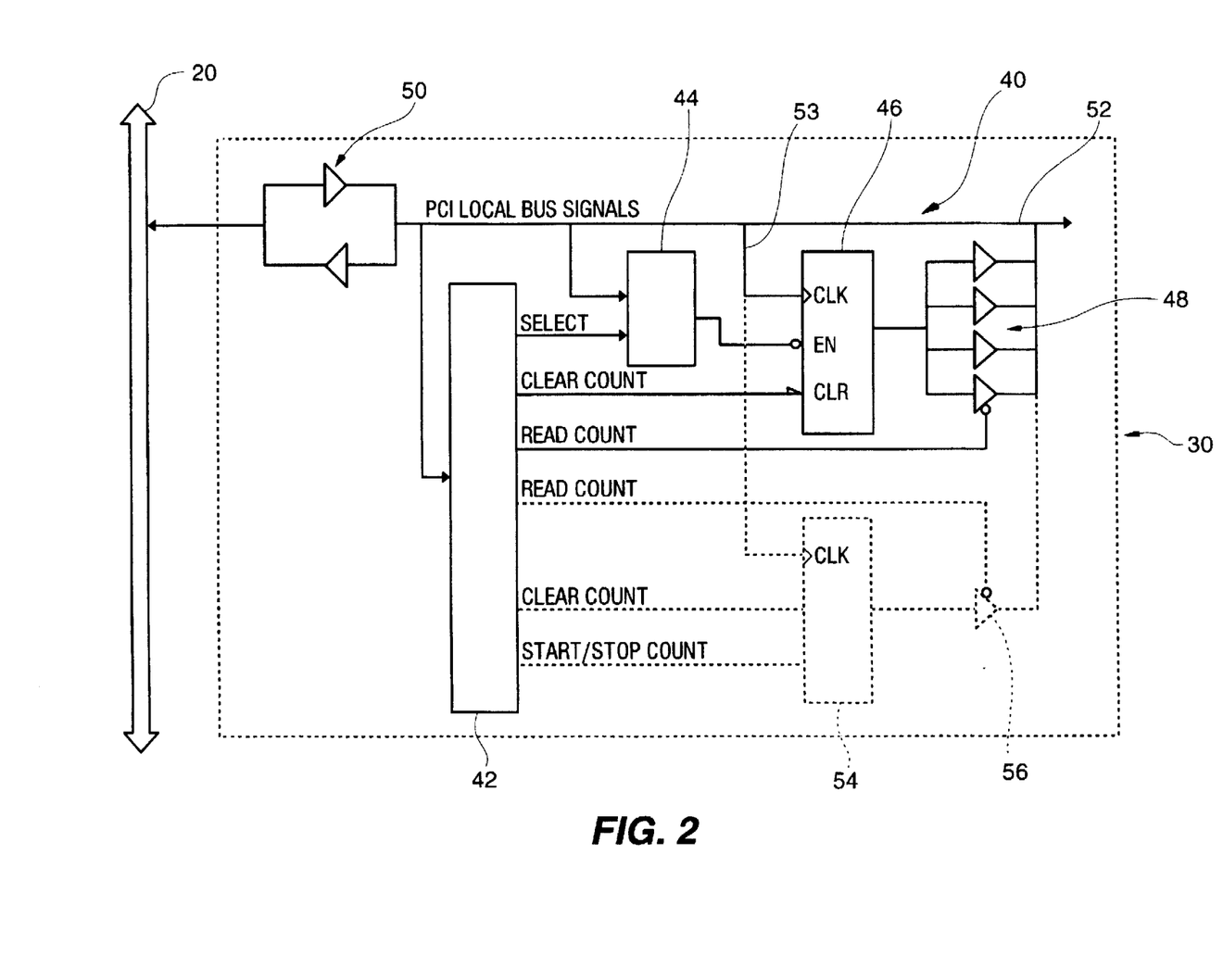
FIG. 2 is a block diagram of a bus monitoring apparatus shown in FIG. 1.

Referring now to FIG. 2, there is shown an exemplary block diagram of the bus monitor 40 associated with a PCI compliant peripheral device such as the SCSI host adapter 30. The bus monitor 40 includes logic such as a decoder 42, one or more state machines 44, a counter 46 and a number of tri-state drivers 48. The bus monitor logic may be interfaced to the PCI Local Bus 20 through a number of known PCI Local Bus drivers/receivers 50. The PCI Local Bus signals are distributed to the bus monitor logic through a number of signal lines 52.

The decoder 42 performs various tasks in response to instructions which are decoded from the PCI Local Bus address signals on lines 52. As described in detail below, the decoder 42 performs tasks such as (1) reconfiguring the state machine(s) 44 so that the bus monitor 40 can monitor various user-specified events; (2) resetting the counter 46 after a monitoring operation has been completed; and (3) enabling the tri-state drivers 48 to permit the contents of the counter 46 to be read out of the counter 46 and onto the PCI Local Bus 20. A bus monitoring software utility (described below) that is executing on the host processor 12 may measure or otherwise determine the utilization or efficiency of the PCI Local Bus 20 relative to the PCI compliant device 30, based at least in part on the contents of the counter 46.

The state machine(s) 44 are selected based on the particular bus transaction events to be monitored. The state machine(s) 44 monitor particular PCI Local Bus signals on lines 52, and enable/disable the counter 46 in response to the presence or absence of the particular PCI Local Bus signals on lines 52. When enabled by the state machine(s) 44, the counter 46 is clocked by a PCI Local Bus clock (CLK) signal on an input line 53. Thus, the counter 46 will count each CLK signal on input line 53 when enabled by the state machine(s) 44, and will stop counting each CLK signal on input line 53 when disabled by the state machine(s) 44. The resulting count value (bit count) stored in the counter 46 is useful in determining or measuring different bus performance characteristics depending upon the monitoring criteria embodied or implemented by the particular state machine 44 that is controlling the counter 46.

For instance, in one embodiment, the count value in the counter 46 may represent the total number of PCI clock cycles associated with all data transfers initiated by the particular PCI compliant device, such as the SCSI host adapter 30. The counter 46 may be a large (32 to 64 bit) counter. The PCI Local Bus 30 nominally operates at clock frequencies up to 33 MHz, or at 66 MHz. At 33 MHz, a 32-bit counter should be able to count PCI clocks for approximately 130 seconds before overflowing. At 66 MHz, a 32-bit counter should be able to count PCI clocks for approximately 65 seconds before overflowing. It should be appreciated that the counter 64 may be embodied as a small high speed 2 or 4-bit prescaling counter followed by additional slower speed ripple counter stages. This alternative embodiment would be primarily useful with high speed PCI Local Bus implementations.

The bus monitor 40 may also include a second counter circuit 54 which may be enabled/disabled (started/stopped) and reset by the decoder 42. As with the contents of the counter 46, the bus monitor software utility that is executing on the processor 12 may measure or otherwise determine the utilization or efficiency of the PCI Local Bus 20 relative to the PCI compliant device 30, based at least in part on the contents of the counter 54. The contents of the counter 54 may be accessed by the host processor 12 via the PCI Local Bus 20 in the same manner as described above with regard to the contents of the counter 46. That is, one or more tri-state drivers 56 may be enabled by the decoder 42 to permit the contents of the counter 54 to be read onto the PCI Local Bus 20.

The counter 54 may be clocked by the PCI Local Bus clock (CLK) signal on the input line 53. Thus, the counter 54 begins counting each . CLK signal that occurs on input line 53 when enabled by the decoder 42, and continues counting CLK signals on input line 53 until disabled by the decoder 42. The resulting count value (bit count) stored in the counter 54 is useful in determining or measuring different bus performance characteristics as described further below.

It should be appreciated that if the counter 46 and/or the counter 54 have bit counts that are larger than the PCI Local Bus 20 (i.e. 64-bit counter and 32-bit PCI Local Bus), then the resulting count value or timer value must be read out of the respective counter or timer and onto the PCI Local Bus in more than one step or operation.

Alternatively, the counter 54 may be replaced with a timer algorithm that executes as part of the bus monitor software utility. In particular, the bus monitor software utility may utilize a conventional computer system real time clock (not shown) to determine or otherwise calculate the total number of clock cycles occurring during a time period. It should be appreciated that the total number of clock cycles occurring during a given time period may be determined by multiplying the frequency of the I/O bus (cycles/second) by the time period (seconds).

Figure 3:
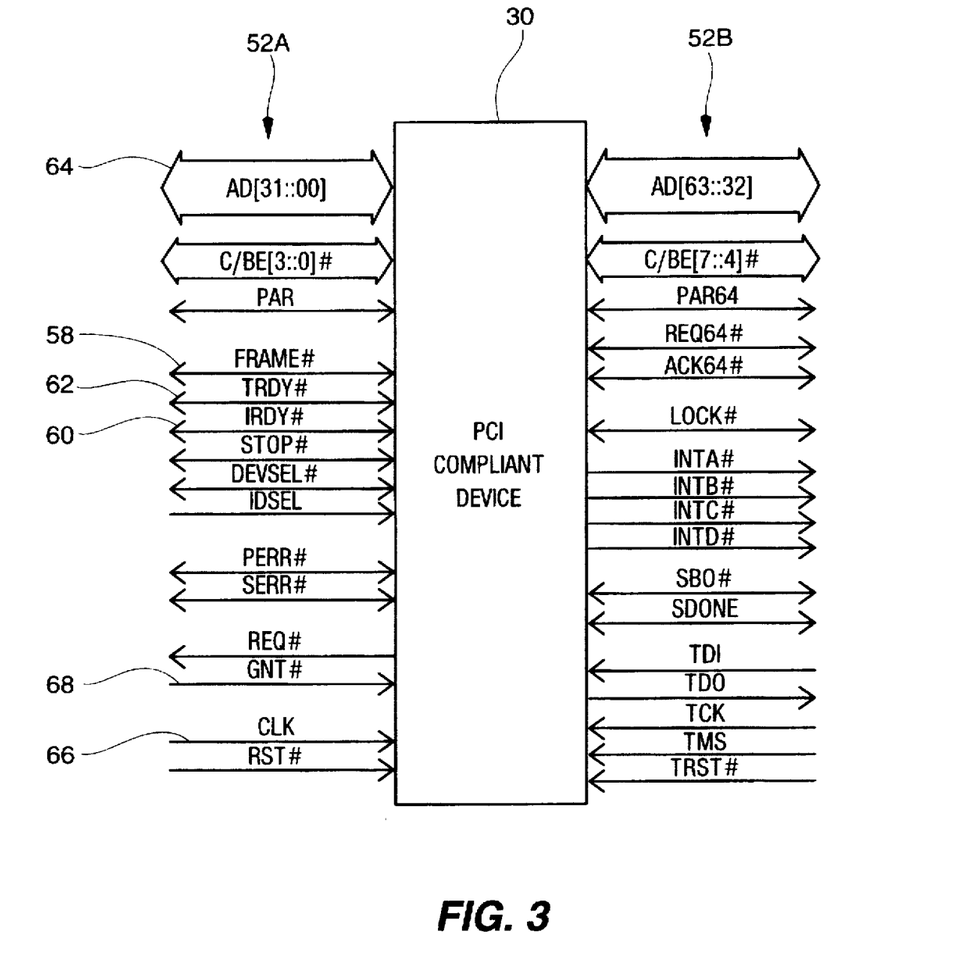
FIG. 3 is a block diagram of showing an exemplary interface between a PCI compliant device and a PCI Local Bus.

FIG. 3 is a block diagram showing an exemplary interface between a PCI compliant peripheral device such as host adapter 30 and the signal lines 52 that define the PCI Local Bus 20. It should be appreciated that the PCI compliant device 30 must be capable of interfacing with required PCI Local Bus signals 52a, and may include the capability of interfacing with optional PCI Local Bus signals 52b.

The following discussion relates to basic transfer control across the PCI Local Bus 20. The fundamentals of all PCI Local Bus transfers are controlled with three signals, namely the cycle frame (FRAME#) signal 58 (FIG. 3), initiator ready (IRDY#) signal 60 (FIG. 3), and target ready (TRDY#) signal 62 (FIG. 3). The FRAME# signal 58 is driven by a bus master to indicate the beginning and end of a PCI Local Bus transaction. More particularly, the FRAME# signal 58 is driven by a bus master to indicate the beginning and duration of a bus transaction. The FRAME# signal 58 is asserted to indicate a bus transaction is beginning. While the FRAME# signal 58 is asserted, data transfers continue. When the FRAME# signal 58 is deasserted, a bus transaction is in a final data phase or has completed.

The IRDY# signal 60 is driven by the bus master to indicate that the bus master is ready to transfer data. That is, the IRDY# signal 60 indicates that the initiating agent (bus master) has the ability to complete the current data phase of the transaction. The IRDY# signal 60 is used in conjunction with TRDY# signal 62. A data phase is completed (i.e. data is transferred across the PCI Local Bus) on any clock where both the IRDY# signal 60 and the TRDY# signal 62 are both asserted. During a write transaction (discussed below), IRDY# signal 60 indicates that valid data is present on the PCI Local Bus multiplexed address and data lines 64 (FIG. 3). During a read transaction (discussed below), IRDY# signal 60 indicates that the bus master is prepared to accept data. Wait cycles (discussed further below) are inserted until both IRDY# signal 60 and TRDY# signal 62 are asserted together.

The TRDY# signal 62 is driven by the target device to indicate that it is ready to transfer data. More particularly, the TRDY# signal 62 indicates that the target agent (selected device) has the ability to complete the current data phase of the transaction. As previously mentioned, the TRDY# signal 62 is used in conjunction with the IRDY# signal 60. A data phase is completed on any clock that both TRDY# signal 62 and IRDY# signal 60 are asserted. During a read transaction, the TRDY# signal 62 indicates that valid data is present on the PCI Local Bus address lines 64. During a write transaction, the TRDY# signal 62 indicates that the target device is prepared to accept data. Wait cycles are inserted until both IRDY# signal 60 and TRDY# signal 62 are asserted together.

The interface between the bus master device and the target device is in an idle state when both FRAME# signal 58 and IRDY# signal 60 are deasserted (high). The first clock edge on which FRAME# signal 58 is asserted is referred to as the address phase of the bus transaction. Address and bus command code information is transferred on the first clock edge defining the address phase. The next clock edge begins the first of one or more data phases during which data is transferred between the master device and the target device on each clock edge for which both IRDY# signal 60 and TRDY# signal 62 are asserted (low). Wait cycles may be inserted in a data phase by either the master device or the target device when either the IRDY# signal 60 or the TRDY# signal 62 is deasserted (driven high). It should be appreciated that when a wait cycle is asserted by a master or target device, the efficiency of the PCI Local Bus is degraded. When the bus master intends to complete only one more data transfer, the FRAME# signal 58 is deasserted and the IRDY# signal 60 is asserted to indicate that the bus master is ready to complete the last data transfer. The final data transfer is completed after the target device asserts the TRDY# signal 62. The interface returns to the idle state with both FRAME# signal 58 and IRDY# signal 60 are deasserted.

PCI Local Bus transactions require at least two additional signals, namely the PCI clock (CLK) signal 66 (FIG. 3) and a grant (GNT#) signal 68 (FIG. 3). The CLK signal 66 provides timing for all transactions on the PCI Local Bus 20 and is an input to every PCI compliant device or agent. The GNT# signal 68 is an arbitration signal that indicates to the PCI compliant device, that access to the PCI Local Bus 20 has been granted by an arbiter in response to a request (REQ#) signal 69 asserted by the PCI compliant device when seeking access to the PCI Local Bus 20.

The GNT# signal 68 is a point-to-point signal. That is, every PCI compliant device has its own GNT# signal line. Once the GNT# signal 68 is issued by the arbiter, the PCI compliant device is granted temporary "ownership" or control of the PCI Local Bus 20. In other words, the PCI compliant device is the only device which may access the PCI Local Bus 20 during the time period that the particular PCI compliant device's GNT# signal 68 is asserted.

Figure 4:
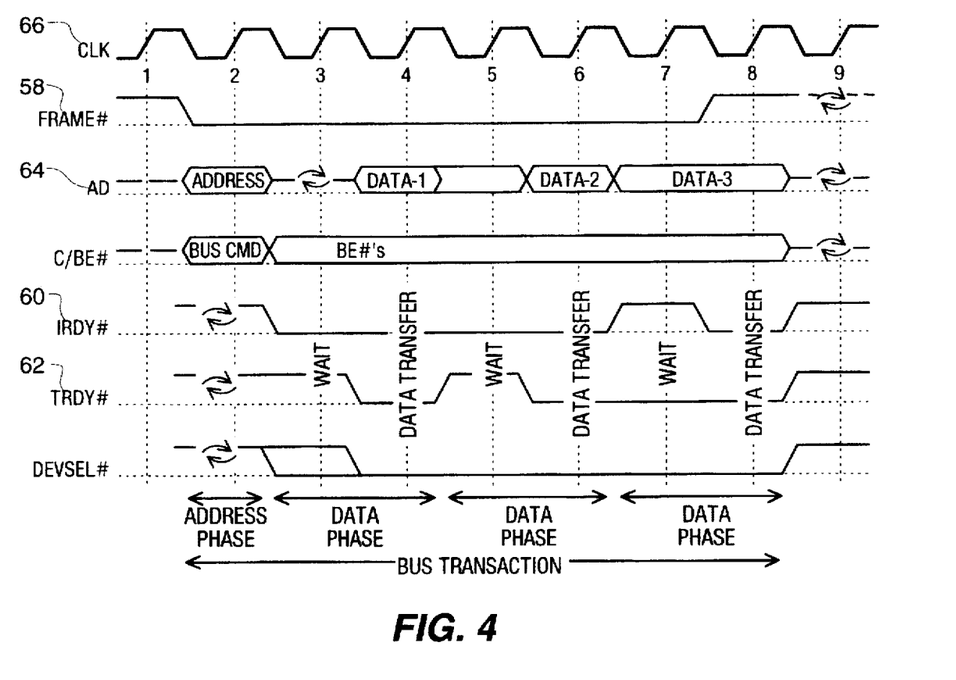
FIG. 4 is a timing diagram for a basic read transaction across a PCI Local Bus.
Figure 5:
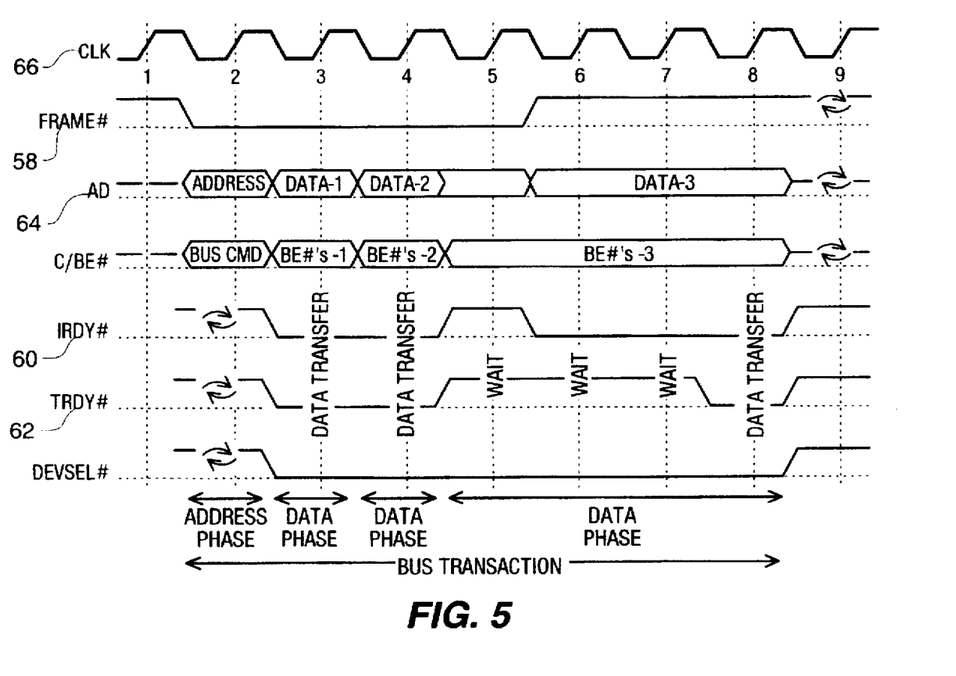
FIG. 5 is a timing diagram for a basic write transaction across a PCI Local Bus.

Referring now to FIGS. 4 and 5, there is shown a timing diagram for a basic read transaction across the PCI Local Bus 20, and a timing diagram for a basic write transaction across the PCI Local Bus 20, respectively. When a signal is drawn as a solid line, it is actively being driven by the current bus master or target device. When a signal is drawn as a dashed line, no agent is actively driving the signal.

With reference to FIG. 4, the read transaction begins with an address phase. The address phase occurs when a bus master asserts the FRAME# signal for the first time (clock 2). During the address phase, the multiplexed address and data lines (AD) 64 contain a valid address, and the control/byte enable (C/BE#) lines contain a valid bus command. The first clock of the first data phase is clock 3. It should be noted that the first data phase on a read transaction requires a turnaround-cycle (as indicated by the double arrows on the AD lines 64 during clock 3) which is enforced by the target device by deasserting the TRDY# signal 62

During a data phase, the C/BE# lines indicate which byte lanes (a 32-bit data bus has 4 byte lanes available for transferring data) are involved in the current data phase. A data phase may consist of wait cycles and a data transfer. Data is successfully transferred on clocks 4, 6 and 8, and wait cycles are inserted on clocks 3, 5 and 7. The first data phase completes in the minimum time for a read transaction because no wait states were asserted by either the initiator device or the target device. The second data phase is extended on clock 5 because the TRDY# signal 62 is deasserted. The last data phase is extended because the IRDY# signal 60 is deasserted on clock 7. The bus master knows at clock 7 that the next data phase is the last data phase. However, because the master is not ready to complete the last data transfer (IRDY# signal 60 is deasserted on clock 7), FRAME# signal 58 stays asserted. Only when the IRDY# signal 60 is asserted can the FRAME# signal 58 be deasserted, as occurs on clock 8, indicating to the target device that this is the last data phase of the transaction.

With reference to FIG. 5, a write transaction begins when the FRAME# signal 58 is asserted for the first time, which occurs on clock 2. The data phases work the same way for both read and write transactions. Thus, the first and second data phases complete with zero wait cycles. However, the third data phase has three wait cycles inserted by the target device, the first of which is inserted or requested by both the initiator device and the target device. That is, both the bus master and the target device insert wait cycles on clock 5. The IRDY# signal 60 must be asserted when the FRAME# signal 58 is deasserted indicating the last data phase. The data transfer is delayed by the bus master on clock 5 because the IRDY# signal 60 is deasserted. The last data phase is signaled by the master on clock 6, but it does not complete until clock 8.

Figure 6:
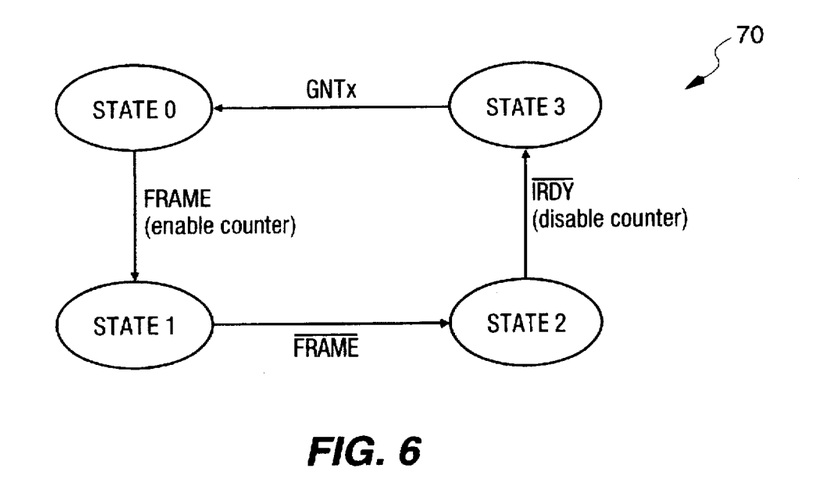
FIG. 6 is a state machine diagram for determining PCI Local Bus utilization.

Referring now to FIG. 6, there is shown a state diagram for a state machine 70 which facilitates determining or measuring the utilization of the PCI Local Bus 20 relative to the PCI compliant device 30. When selected by the decoder 42 (FIG. 2), the state machine 70 monitors a number of particular PCI Local Bus signals, namely, GNT# signal 68, FRAME# signal 58, and IRDY# signal 60, to determine whether to enable or disable the counter 46 (FIG. 2) during one or more bus transactions that occur during a predetermined test period.

In particular, the state machine 70 monitors the GNT# signal 68 for an assertion by a PCI arbiter device (not shown). As previously mentioned, an asserted GNT# signal 68 indicates that the arbiter device has granted the PCI compliant device 30 access to the PCI local Bus 20 during the next bus transaction. Thus, during the next bus transaction, the PCI compliant device 30 acts as a bus master. Once the GNT# signal 68 has been asserted, the state machine 70 transitions to state (0). While in state (0), the state machine 70 monitors the FRAME# signal 58 for an assertion by the bus master.

The assertion of the FRAME# signal 58 indicates the beginning of a PCI Local Bus transaction as previously described. Thus, once the FRAME# signal 58 is asserted, the state machine advances to state (1) and enables the counter 46 to begin counting CLK signals 66 on the input line 53 (FIG. 2). While in state (1), the state machine 70 monitors the FRAME# signal 58 for a deassertion by the bus master while the counter 46 continues to count each CLK signal 66 on the input line 53. The deassertion of the FRAME# signal 58 indicates that the next data phase will be the last data phase of the PCI Local Bus transaction, as previously described.

Once the FRAME# signal 58 is deasserted, the state machine advances to state (2). While in state (2), the state machine 70 monitors the IRDY# signal 60 for a deassertion (not IRDY#) by the initiator device. Once the IRDY# signal 60 is deasserted, the last data phase has completed, and the PCI Local Bus transaction has completed. Thus, the state machine 70 advances to state (3) and disables the counter 46 to prevent the counter 46 from counting any more CLK signals 66 on the input line 53 (FIG. 2). While in state (3), the state machine 70 monitors the GNT# signal 68 to detect when the next bus transaction involving the particular PCI compliant device will begin.

The resulting count value in the counter 46 represents the total number of PCI clock cycles required for the address phase, data phase(s) and wait cycles that comprise a typical PCI Local Bus transaction. The utilization of the PCI Local Bus 20 by the PCI compliant device 30 may be measured or determined by dividing the count value in the counter 46 by the clock frequency of the PCI Local Bus 20 (typically 33 MHz), and then dividing the result by the total elapsed time of the test period (such as five or ten seconds). As previously mentioned, the test period may be timed the bus monitor software utility using the host computer real time clock.

The utilization of the PCI local Bus 20 by the PCI compliant device 30 may also be measured or determined by dividing the count value in the counter 46 by the count value in the counter 54 (FIG. 3). As previously mentioned, the count value in the counter 54 represents the total number of PCI clocks that occurred during the test period. It should be appreciated that a figure of merit indicative of the PCI Local Bus utilization by the PCI compliant device may be determined or calculated as described above by the bus monitoring software utility executing on the host processor 12.

Figure 7:
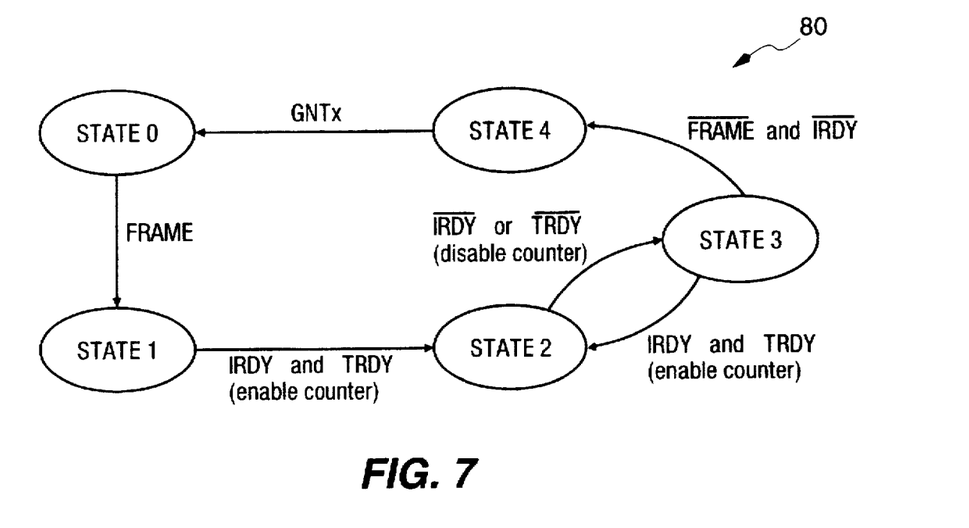
FIG. 7 is a state machine diagram for determining PCI Local Bus efficiency.

Referring now to FIG. 7, there is shown a diagram for state machine 80 which facilitates determining or measuring the efficiency of the PCI Local Bus 20 relative to the PCI compliant device 30. The state machine 80 facilitates determining how efficiently the PCI Local Bus 20 operates during one or more bus transactions involving a particular PCI compliant device during a predetermined test period. When selected by the decoder 42 (FIG. 2), the state machine 80 monitors a number of particular PCI Local Bus signals, namely, GNT# signal 68, FRAME# signal 58, IRDY# signal 60, and TRDY# signal 62, to determine whether to enable or disable the counter 46 (FIG. 2).

As with the state machine 70, the state machine 80 monitors the GNT# signal 68 for an assertion by a PCI arbiter device. Once the GNT# signal 68 has been asserted, the state machine 80 transitions to state (0). While in state (0), the state machine 80 monitors the FRAME# signal 58 for an assertion by the bus master. Once the FRAME# signal 58 is asserted, the state machine 80 advances to state (1) and monitors both the IRDY# signal 60 and the TRDY# signal 62 to detect when both signals are asserted. Once the state machine 80 detects that both the IRDY# signal 60 and the TRDY# signal 62 are asserted, the state machine advances to state (2) and enables the counter 46 to begin counting CLK signals 66 on the input line 53 (FIG. 2).

While in state (2) the state machine 80 continues to monitor the IRDY# and TRDY# signals 60, 62 to detect when either the IRDY# signal 60 or the TRDY# signal 62 is deasserted (not IRDY# or not TRDY#). That is, the state machine 80 disables the counter 46 when a wait state has been asserted (i.e. when a data transfer has been delayed). When either the IRDY# signal 60 or the TRDY# signal 62 is deasserted, the state machine 80 transitions to state (3) and disables the counter 46 from counting subsequent CLK signals 66 on the input line 53.

While in state (3) the state machine 80 continues to monitor the IRDY# and TRDY# signals 60, 62 to detect (1) when both IRDY# and TRDY# signals 60, 62 are both asserted again, or (2) when the FRAME# signal 58 and the IRDY# signal 60 are deasserted. When both IRDY# and TRDY# signals 60, 62 are asserted, the state machine 80 transitions back to state (2) and enables the counter 46 to begin counting CLK signals 66 on the input line 53 from the point where the counter left off prior to being disabled during the transition from state (2) to state (3). The deassertion of the FRAME# and IRDY# signals 58, 60 while the state machine is in state (3) indicates that the bus transaction is ending. Thus, when FRAME# 58 is deasserted (while in state (3)), the state machine 80 transitions to state (4). While in state (4), the state machine 80 monitors the GNT# signal 68 to detect when the next bus transaction involving the particular PCI compliant device will begin.

The resulting count value in the counter 46 represents the total number of PCI clock cycles required to transfer data during a PCI Local Bus transaction or during a predetermined test period. The efficiency of the PCI Local Bus 20 when transacting with the PCI compliant device 30 may be measured or determined by dividing the resulting count value in the counter 46 by the total number of clocks cycles utilized during the bus transaction. The total number of clocks cycles utilized during the bus transaction may be determined by state machine 70 if executing simultaneously with the state machine 80. That is, the state machine 70 may provide a value indicative of the total number of clock cycles utilized during the bus transaction (the denominator), and the state machine 80 may provide the total number of clock cycles required to transfer the data during the same PCI Local Bus transaction (the numerator). It should be appreciated that a figure of merit indicative of the PCI Local Bus efficiency may be determined or calculated as described above by the monitoring software utility executing on the host processor 12.

It should also be noted that the state machines 70, 80 are able to monitor the PCI Local Bus signals even when unexpected transaction termination events occur such as a target initiated retry, disconnect or target abort, which are defined in the above-mentioned PCI specification.

In operation, the bus monitor 40 may be controlled by a PCI monitoring utility or software program that executes on the host processor 12. In particular, the bus monitoring software utility may include a graphical user interface which permits a user to select the particular PCI Local Bus performance characteristics to be measured or otherwise determined. The graphical user interface may also permit the user to select the duration of the test period, and select a particular bus transaction or testing sequence to implement during the specified test period. In addition, the monitoring software may initialize the bus monitor 40 such as clearing the counter 46 and/or counter 54 via the decoder 42.

Once the bus monitor 40 is initialized, the monitoring software may execute either a predetermined data transfer sequence or an application program while recording the elapsed test time. After the test period has expired, the monitoring software may read the count values stored in the counter 46 and/or the counter 54, and then perform the necessary characterization calculations to arrive at a value representing the particular performance criteria selected. It should be appreciated that known remote communication techniques may be employed to control the bus monitoring software utility such that a remote service facility may remotely communicate with the computer 10 and diagnose or otherwise determine the performance of the PCI Local Bus 20 relative to a particular PCI compliant device 30.

Figure 8:
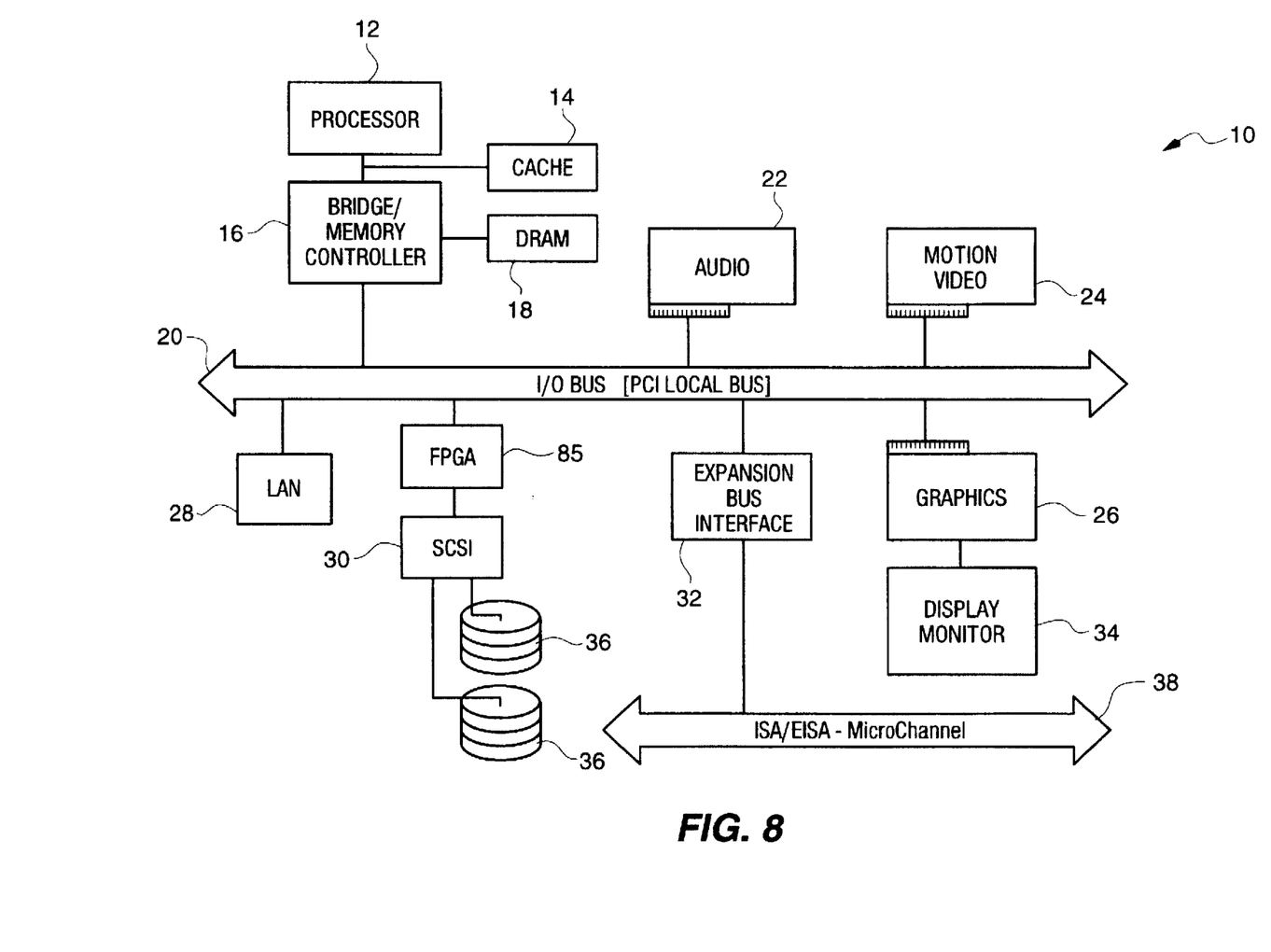
FIG. 8 is a block diagram of a second embodiment of a computer system architecture which incorporates the features of the present invention therein.

Referring now to FIG. 8, a conventional field programmable gate array (FPGA) 85 may be used to develop additional state machines similar to state machines 70, 80 prior to implementing the bus monitor logic in an end-user peripheral product. More particularly, prior of implementing a state machine as silicon logic gates and integrating the logic gates within an integrated circuit, the state machine may be developed, tested and optimized within the FPGA 85. The FPGA 85 may be of a static random access memory (SRAM) type, or may be a fusible-link type. Initially, a down-loadable configuration file representing a proposed state machine may be created using known development tools (e.g. schematic capture, simulation, auto place and route) that are conventionally associated with the FPGA 85. The configuration files are then downloaded from system memory (not shown) into the FPGA 85 by the host processor 12 prior to executing a performance test. In this manner, state machines may be developed and tested prior to manufacturing end products incorporating the bus monitor 40 therein.

As shown in FIG. 8, the circuit board containing the FPGA 85 may be inserted into a slot of the PCI Local Bus 20. The host adapter card of the PCI compliant device to be tested against, may then be inserted into the FPGA circuit board. In this configuration, the FPGA 85 may monitor the necessary PCI Local Bus signals that are coupled from the PCI Local Bus 20 to the PCI compliant device via PCI interfacing logic on the FPGA circuit board.

Figure 9:
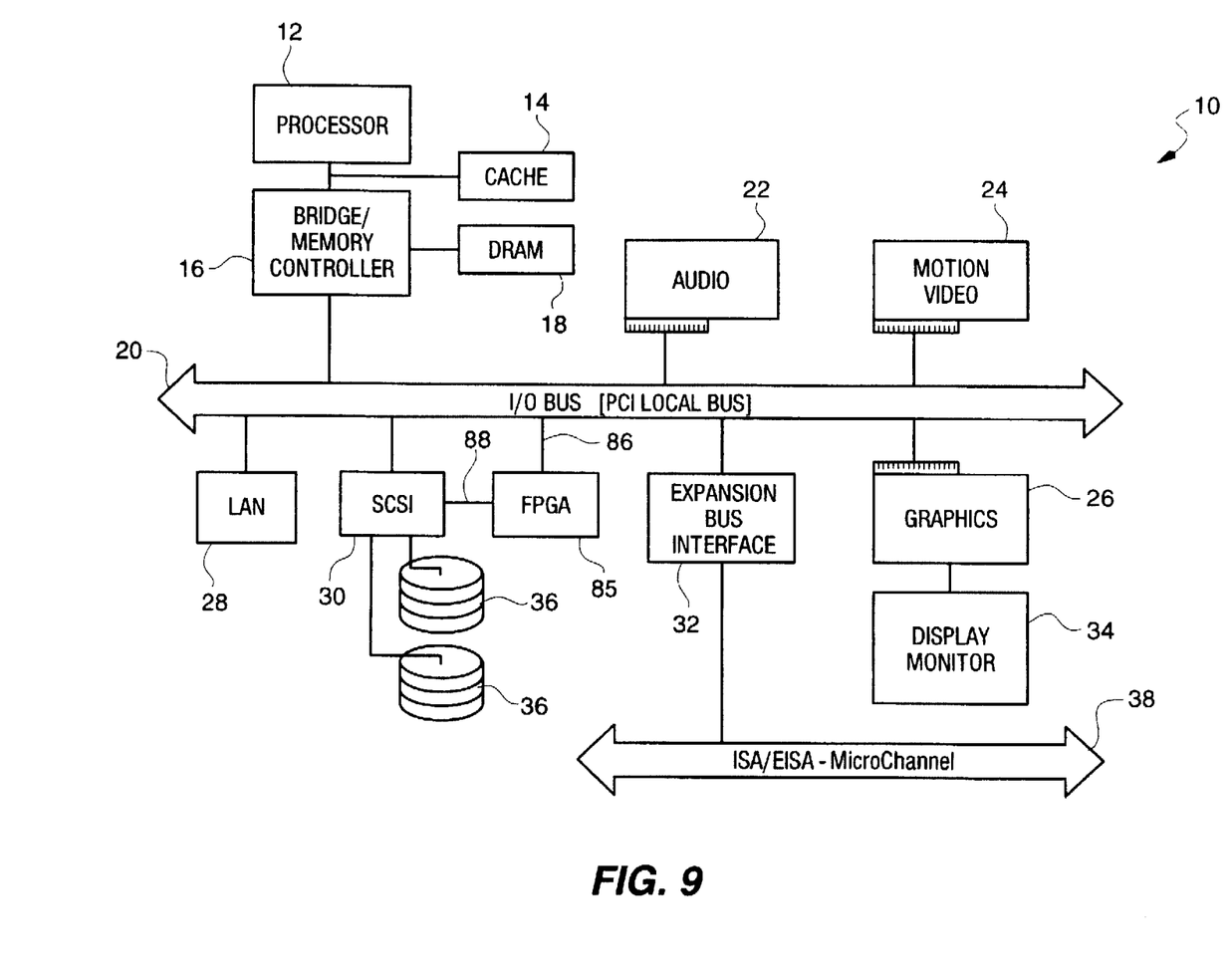
FIG. 9 is a block diagram of a third embodiment of a computer system architecture which incorporates the features of the present invention therein.

Alternatively, as shown in FIG. 9, the FPGA circuit board may be inserted into a spare PCI slot 86, and jumper wires 88 may be coupled from the FPGA 85 to at least the GNT# line on the host adapter board of the PCI compliant device. Thus, the FPGA 85 may monitor the necessary PCI Local Bus signals from the PCI slot that it is inserted into, and may monitor the GNT# line from the host adapter board of the PCI compliant device to be tested. It should be appreciate that once a state machine has been designed, tested and optimized in an FPGA, the same state machine may be implemented in silicon within an integrated circuit for use in a PCI compliant end product. It should also be appreciated that the FPGA 85 may also be utilized in an end-user environment, if desired.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, it should be appreciated that the bus monitor of the present invention may be used for measuring bus performance characteristics other than the exemplary bus utilization and bus efficiency characteristics disclosed above. That is, other bus performance characteristics may be measured or otherwise determined by providing additional state machines which monitor particular I/O bus signals for specific events in the same manner as described above. For instance, performance characteristics such as (1) the time that a peripheral device must wait to access the I/O bus after asserting an arbitration (ARB) signal; (2) a data burst size; (3) a wait state count; and (4) an exception count performance criteria may be measured or otherwise determined as described above. Thus, nothing in the above disclosure should be construed as limiting the scope of the invention to only measuring I/O bus utilization or efficiency relative to a compliant peripheral device.

It should also be appreciated that when the bus monitor logic is integrated into the PCI compliant device as shown in FIG. 1, the PCI compliant device has strategic advantages in that the end-user of the PCI compliant device is provided with a diagnostic tool, as well as a tool for tuning the performance of a computer system incorporating the PCI compliant device.

In addition, the bus monitor 40 of the present invention may be used to monitor the performance of I/O buses other than the exemplary PCI Local Bus discussed in detail above. That is, the same or substantially similar state machines 70, 80 may be utilized to monitor the performance of another type of I/O bus, such as a SCSI bus by simply monitoring the bus signal(s) which substantially correspond with the PCI Local Bus signals which were monitored as disclosed above.

What is claimed is:

1. A method of measuring performance of an I/O bus, comprising the steps of:
   (a) determining a number of I/O bus clock cycles that occur during I/O bus transactions involving a peripheral device during a time period, said determining step comprising the step of generating a first count value indicative of the number of I/O bus clock cycles that occur during I/O bus transactions involving the peripheral device during the time period; and
   (b) determining a bus performance value for the I/O bus based on the number of I/O bus clock cycles determined in step (a).

2. The method of claim 1, wherein step (b) includes the step of:
   (d) dividing the first count value by a second count value indicative of a total number of I/O bus clock cycles that occur during the time period to produce a bus utilization value.

3. The method of claim 1, wherein step (c) includes the steps of:
   (e) enabling a counter when a first I/O bus signal is asserted; and
   (f) disabling the counter when the first I/O bus signal is deasserted and a second I/O bus signal is deasserted.

4. The method of claim 3, wherein the I/O bus is a PCI Local Bus.

5. The method of claim 4, wherein the first I/O bus signal is a FRAME# signal, and the second I/O bus signal is an IRDY# signal.

6. The method of claim 1, further including the step of:
   (d) determining a number of I/O bus clock cycles that occur during data transfers involving the peripheral device during the time period.

7. The method of claim 6, wherein step (d) includes the step of:
   (e) generating a second count value indicative of the number of I/O bus clock cycles that occur during data transfers involving the peripheral device during the time period.

8. The method of claim 7, wherein step (b) includes the step of:
   (f) dividing the second count value by the first count value to produce a bus efficiency value.

9. The method of claim 7, wherein step (e) includes the steps of:
   (g) enabling a counter to count the number of I/O bus clock cycles that occur when a first I/O bus signal and a second I/O bus signal are asserted; and
   (h) disabling the counter when either the first I/O bus signal or the second I/O bus signal are deasserted.

10. The method of claim 9, wherein the I/O bus is a PCI Local Bus.

11. The method of claim 10, wherein the first I/O bus signal is an IRDY# signal, and the second I/O bus signal is a TRDY# signal.

12. An apparatus for measuring performance of an I/O bus, comprising:
   a counter connected to the I/O bus for counting a number of I/O bus clock cycles that occur during I/O bus transactions involving a peripheral device during a time period;
   means for determining a bus utilization value for the I/O bus based on the number of I/O bus clock cycles counted by the counter;
   means for enabling the counter to count a number of I/O bus clock cycles that occur when a first I/O bus signal is asserted during the time period; and
   means for disabling the counter when the first I/O bus signal is deasserted and a second I/O bus signal is deasserted during the time period.

13. The apparatus of claim 12, wherein:
   the I/O bus is a PCI Local Bus,
   the first I/O bus signal is a FRAME# signal, and the second I/O bus signal is an IRDY# signal.

14. The apparatus of claim 12, wherein:
   the counter stores a count value indicative of the number of I/O bus clock cycles that occur during I/O bus transactions involving a peripheral device during the time period, and
   the means for determining the bus utilization value includes means for dividing the count value by a value indicative of a total number of I/O bus clock cycles that occur during the time period to produce the bus utilization value.

15. An apparatus for measuring performance of an I/O bus, comprising:

a counter connected to the I/O bus for counting a number of I/O bus clock cycles that occur during data transfers involving the peripheral device during a time period;

means for determining a bus efficiency value for the I/O bus based on the number of I/O bus clock cycles counted by the counter;

means for enabling the counter to count a number of I/O bus clock cycles that occur when a first I/O bus signal and a second I/O bus signal are asserted during the time period; and means for disabling the counter when either the first I/O bus signal or the second I/O bus signal is deasserted during the time period.

16. The apparatus of claim 15, wherein:

the I/O bus is a PCI Local Bus, the first I/O bus signal is an IRDY# signal, and the second I/O bus signal is a TRDY# signal.

17. An apparatus for measuring performance of an I/O bus, comprising:

a counter connected to the I/O bus for counting a number of I/O bus clock cycles that occur during data transfers involving the Peripheral device during a time period; and means for determining a bus efficiency value for the I/O bus based on the number of I/O bus clock cycles counted by the counter; wherein the counter stores a count value indicative of the number of I/O bus clock cycles that occur during data transfers involving the peripheral device during the time period, and the means for determining the bus efficiency value includes means for dividing the count value by a value indicative of a total number of I/O bus clock cycles that occur during the time period to produce the bus efficiency value.

* * * * *